(No Model.)

T. J. REID.
TIRE TRUING MACHINE.

No. 408,044. Patented July 30, 1889.

Attest
Alfred M Allen
George Heidman

Inventor
Thomas J. Reid
by Arthur Stem Atty.

N. PETERS, Photo-Lithographer, Washington, D. C.

UNITED STATES PATENT OFFICE.

THOMAS J. REID, OF GANANOQUE, ONTARIO, CANADA.

TIRE-TRUING MACHINE.

SPECIFICATION forming part of Letters Patent No. 408,044, dated July 30, 1889.

Application filed April 17, 1889. Serial No. 307,581. (No model.)

*To all whom it may concern:*

Be it known that I, THOMAS J. REID, a citizen of the United States, at present residing at Gananoque, in the county of Leeds and Province of Ontario, Canada, have invented a certain new and useful Improvement in Tire-Truing Machines, of which the following is a full, clear, and exact description, reference being had to the accompanying drawings, forming part of this specification.

My invention relates to machines for expanding or contracting tires for vehicle-wheels, so that all tires may be made to conform exactly to the standard tire of the size required.

When tires are manufactured to fit the different sizes of wheels, it very rarely happens that any two tires are of exactly the same size; and the object of my invention is to obtain a machine in which the tire may be easily and accurately expanded when too small and contracted or upset when too large, and thus made to conform exactly to the size required or the circle of the tire made true when necessary.

The novelty of my invention consists in the construction and arrangement of parts, as will hereinafter more fully appear.

Figure 1:
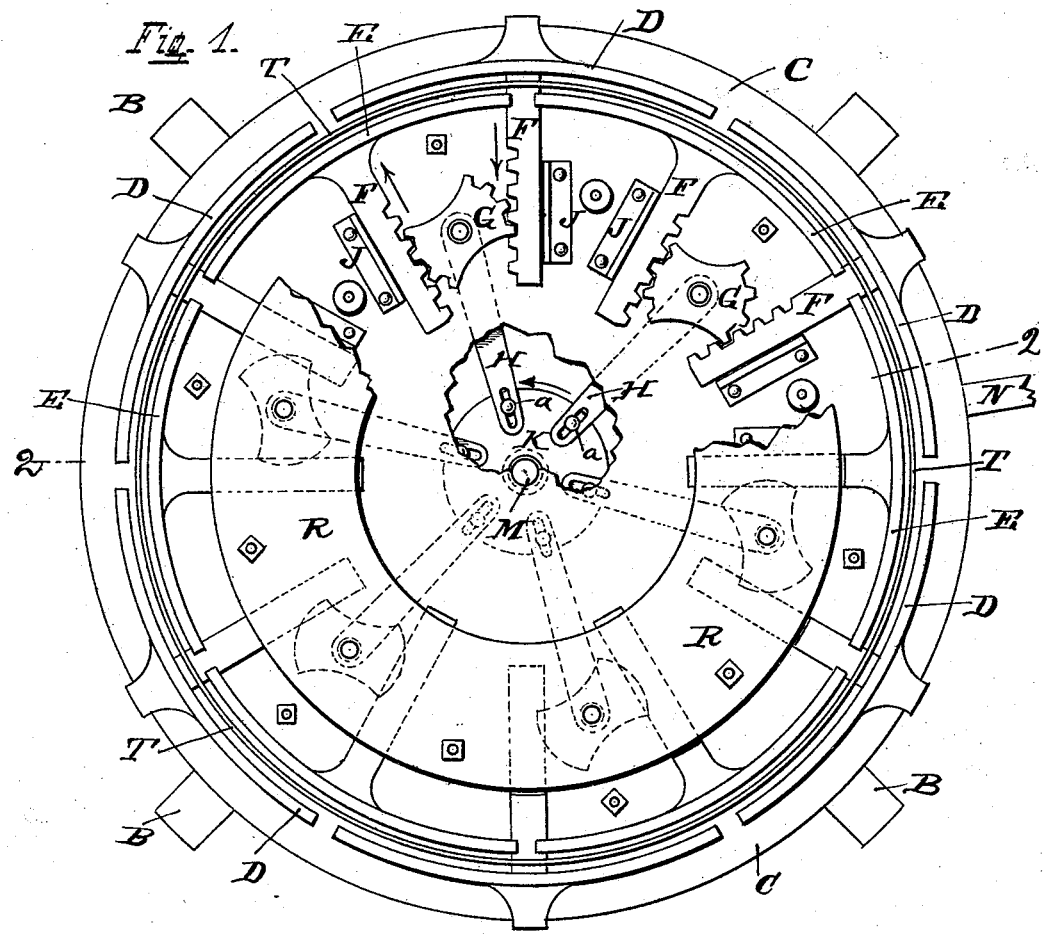
Figure 2:
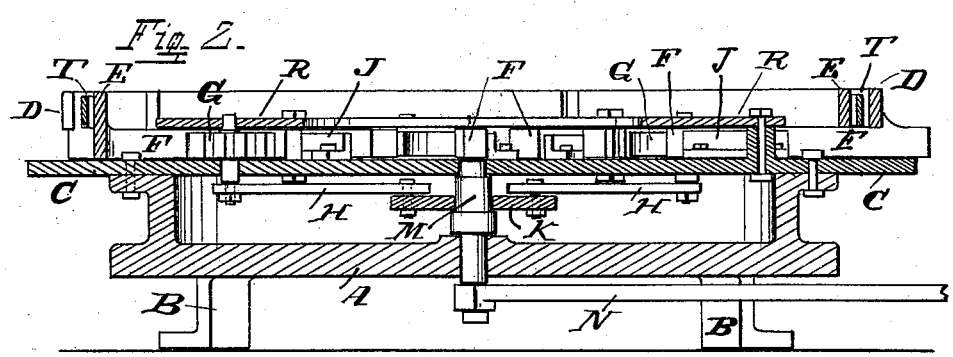

Referring to the drawings, Figure 1 is a top plan view of the machine with portions of the face and bottom plates removed. Fig. 2 is a cross-section of the machine, taken on the line 2 2 of Fig. 1.

The working parts are supported in the circular frame A, resting on the legs or feet B. Bolted to this frame A is a circular plate C, forming the bottom plate of the machine. Upon this plate C a sufficient number of segmental iron dies or formers D are arranged to make a complete circle, somewhat larger in diameter than the required diameter of the tire to be operated upon. Within and concentric with this outer set another and similar set of dies E are arranged, so as to make a complete circle, whose diameter is somewhat smaller than that required. The ends of these segmental dies or formers do not touch, but a small space is left between each segment, and the two sets of segmental dies are made to alternate with each other, as shown in Fig. 1.

To the middle and lower edge of each segmental die is rigidly attached an arm F, extending inwardly along the surface of the bottom plate C. The die and arm are so arranged, however, that the die can be adjusted along the arm when required. These arms are each toothed on one side only, the arms of the outer set on one side, and the arms of the inner set on the other, so that the toothed edges of the arms face each other. Engaging each pair of arms thus toothed are the segmental pinions G, and in order to keep the racks in engagement with the pinions angle-irons J are firmly bolted to the bottom plate to abut up against the plane side of the arms and form guides. The axles of the pinions G extend down through the bottom plate C, where the levers H are rigidly attached. These levers extend into the central disk K, to which they are attached by the pins $a$, extending up through slots in the levers, the levers being slotted in order to allow them to move freely when the disk is turned. This central disk K revolves on an axle M, journaled in the bottom plate C and frame A of the machine. At the lower end of this axle, at the bottom of the frame, a lever N is attached, which extends out between the legs of the machine, where manual labor may be used to operate it and turn the disk; or the apparatus may be easily arranged to be operated by machine-power. A face-plate R, bolted to the bottom plate, covers the operating parts of the machine.

In order to use the machine to bring to a true standard ties that may be slightly larger or slightly smaller than the size required, or not a true circle, the segmental dies are adjusted on their carrying-arms, so that the external diameter of the inner series of segmental dies shall be exactly the internal diameter of the standard tire, and the internal diameter of the outer series of dies the external diameter of the true tire. The lever N is then turned to revolve the disk in a direction opposite to the direction of the arrow. The turning of the disk shifts the levers H, which operate upon and turn the segmental pinions, which in turn operate on the racks or arms, so that all the outer segmental dies are moved outward and the inner ones brought in, thus leaving a circular channel in which the tire T to be operated on is placed. When the tire to be trued is placed between the bands, the disk is then revolved in the direction of the arrow, and by the action of the levers H on the pinions the outer segmental dies are brought in and the inner ones pushed out. This is continued until both sets of segmental dies are brought into tight contact with the tire—that is, the operation is continued until the tire is made to conform to the true standard. If the tire was originally too small, the action of the inner dies will expand it, and if too large the action of the outer dies will compress or upset it to the proper size. The variations in different sizes of wheels range from about three feet to four feet eight inches, and for the larger sizes of tires another series of larger iron can be used, or as many sets varying in size as necessary, the smaller sets being removed and replaced by the larger sets, as to adjust the same dies for all sizes of tires would leave too wide an opening between the segments of each set when used for truing the larger sizes.

A wire circular opening is left in the face-plate, as shown in Fig. 1, so that my machine can be used as a truing tiring trestle in the process of tiring wheels, as described in my invention secured by Letters Patent of the United States No. 393,030, or under old processes, the wide opening being left in the center to allow for the hub and necessary dish of the spokes.

My machine can also be used with great advantage in the operation of contracting tires on wheels, a set of inside dies being furnished of shorter segments, so that the segmental dies can pass between the spokes of the wheel to support the rim of the wheel on the inside while the tire is being contracted on the rim by the outside circle, the hub being held in place by a screw coming down from above, as in my tiring process.

When used as a tire-contractor, if desired, the racks or arms of the segmental dies can be so arranged that the pinions or other operating mechanism will only operate the outer set of dies, the expanding set being held immovable. Various means have been tried to contract tires upon the rims of wheels cold, but all, so far as I know, have been abandoned, because there was no means devised for supporting the wheel on the inside, and the outside pressure inwardly crushed and destroyed many of the wheels by injuring the rim or dishing or springing the spokes. With my machine used for this purpose these difficulties are overcome. The hub and rim of the wheel are supported and held immovable, so that the outside pressure can have no effect.

My machine can also be conveniently used for punching holes in the tire for the tire-bolts, a series of punches being arranged between the tire and contracting or expanding dies, so that all the bolt-holes may be made at one operation. In the same way any desired portion of the tire can be cut off before being welded. The machine can also be attached to a water-tank, so that when used for tiring by the old process of shrinking the tire on while hot the machine may be dipped in the water to cool the tire off on the rim of the wheel. In tiring the wheel under the old processes, by shrinking the tire on hot the wheel is often dished when the tire contracts as it is cooled but when held in my machine this difficulty is overcome.

Having thus fully described my invention, what I claim, and desire to secure by Letters Patent, is—

1. In a tire-truing machine, the combination, with a circular series of segmental dies, of a like series of similar dies arranged concentrically and in the same plane therewith, with means—such as racks, pinions, and connections—for radially reciprocating each series of dies in opposite directions, in the manner and for the purpose described.

2. In a tire-truing machine, the combination, with a circular series of segmental dies, of a similar series of concentrically-arranged dies, radially-extending rack-arms fixed to and carrying said dies, and means—such as pinions, central disk, and connections—for simultaneously reciprocating the arms of each set in opposite directions, in the manner and for the purpose described.

3. In a tire-truing machine, the combination, with a circular series of segmental dies, of a similar series of concentrically-arranged dies, centrally-extending arms or racks fixed to and carrying said dies, racks of each series alternating with each other, pinions engaging each pair of alternating racks, and means—such as the disk K and rotating devices—for operating the pinions, in the manner and for the purpose described.

4. In a tire-truing machine, the combination, with a circular series of segmental dies, of a similar series of concentrically-arranged dies, centrally-extending racks fixed to and carrying said dies, racks of each series alternating with each other, pinions engaging each pair of alternating racks, levers operating said pinions having their inner ends slotted and fixed to a centrally-revolving disk, and means for revolving said disk, in the manner and for the purpose described.

THOMAS J. REID.

Witnesses:
JOHN THOMPSON,
W. B. CARROLL.